United States Patent
Elwell et al.

(10) Patent No.: US 6,935,820 B2
(45) Date of Patent: Aug. 30, 2005

(54) LIGHTED TIE DOWN ANCHOR AND METHOD FOR USING SAME

(75) Inventors: James P. Elwell, Ankeny, IA (US); Jamie R. Bernardy, Ames, IA (US); Ben F. Conkey, Nevada, IA (US)

(73) Assignee: Putco, Inc., Story City, IA (US)

( * ) Notice: Subject to any disclaimer, the term of this patent is extended or adjusted under 35 U.S.C. 154(b) by 62 days.

(21) Appl. No.: 10/379,948

(22) Filed: Mar. 4, 2003

(65) Prior Publication Data

US 2004/0175249 A1 Sep. 9, 2004

(51) Int. Cl.$^7$ ................................................. B60P 7/08
(52) U.S. Cl. ........................ 410/106; 410/102; 410/110
(58) Field of Search .......................... 410/101, 102, 410/106, 109, 110, 112, 113, 116; 248/499; 24/265 CD, 115 K; 362/485; 340/479; 16/444

(56) References Cited

U.S. PATENT DOCUMENTS

| | | | | |
|---|---|---|---|---|
| 4,005,313 A | * | 1/1977 | Tibbits | 307/10.1 |
| 4,585,902 A | * | 4/1986 | Munroe | 174/87 |
| 4,818,006 A | * | 4/1989 | Arndt | 296/32 |
| 4,974,125 A | * | 11/1990 | McGehee | 362/505 |
| 4,990,887 A | * | 2/1991 | Lee | 340/479 |
| 5,089,805 A | * | 2/1992 | Salsman | 340/467 |
| 5,258,893 A | * | 11/1993 | Finneyfrock | 362/485 |
| 5,315,066 A | * | 5/1994 | Spiteri, Sr. | 174/87 |
| 5,434,553 A | * | 7/1995 | Rhodes | 340/468 |
| 5,476,349 A | * | 12/1995 | Okland | 410/106 |
| 5,495,400 A | * | 2/1996 | Currie | 362/551 |
| 5,874,894 A | * | 2/1999 | Heller | 340/479 |
| 5,954,539 A | * | 9/1999 | Hornung | 439/590 |
| 5,967,719 A | * | 10/1999 | Davenport | 410/106 |
| 5,997,227 A | * | 12/1999 | Bundy | 410/106 |
| 6,150,765 A | * | 11/2000 | Crunk | 315/129 |
| 6,231,285 B1 | * | 5/2001 | Elwell et al. | 410/107 |
| 6,260,990 B1 | * | 7/2001 | Saunders | 362/485 |
| 6,328,597 B1 | * | 12/2001 | Epps | 439/502 |
| 6,357,899 B1 | * | 3/2002 | Craven | 362/485 |
| 6,523,888 B1 | * | 2/2003 | Yan et al. | 296/215 |
| 6,553,629 B2 | * | 4/2003 | Grady et al. | 16/444 |
| 6,591,927 B1 | * | 7/2003 | Honekamp et al. | 180/90 |
| 6,676,278 B2 | * | 1/2004 | Striebel et al. | 362/267 |

\* cited by examiner

*Primary Examiner*—H. Gutman
(74) *Attorney, Agent, or Firm*—McKee, Voorhees & Sease, P.L.C.

(57) ABSTRACT

A lighted anchor for a vehicle is adapted to be attached to the rear end of a side wall of the carrying bed of the vehicle. The anchor includes wires leading from an anchor light in the anchor member. The wires can be connected to the tail light of the vehicle so that the anchor light is on when the tail light is on.

3 Claims, 2 Drawing Sheets

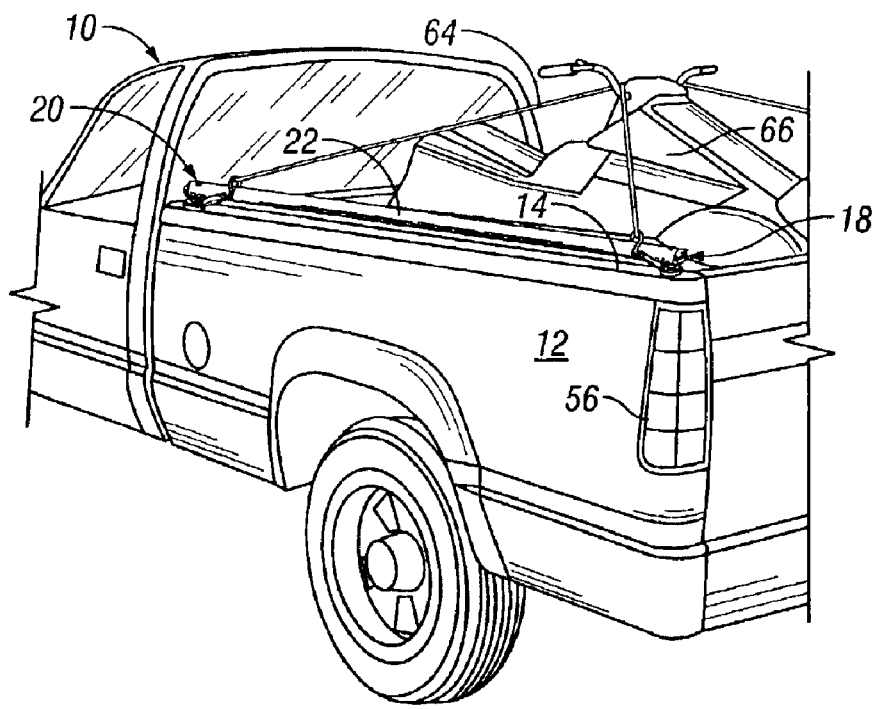
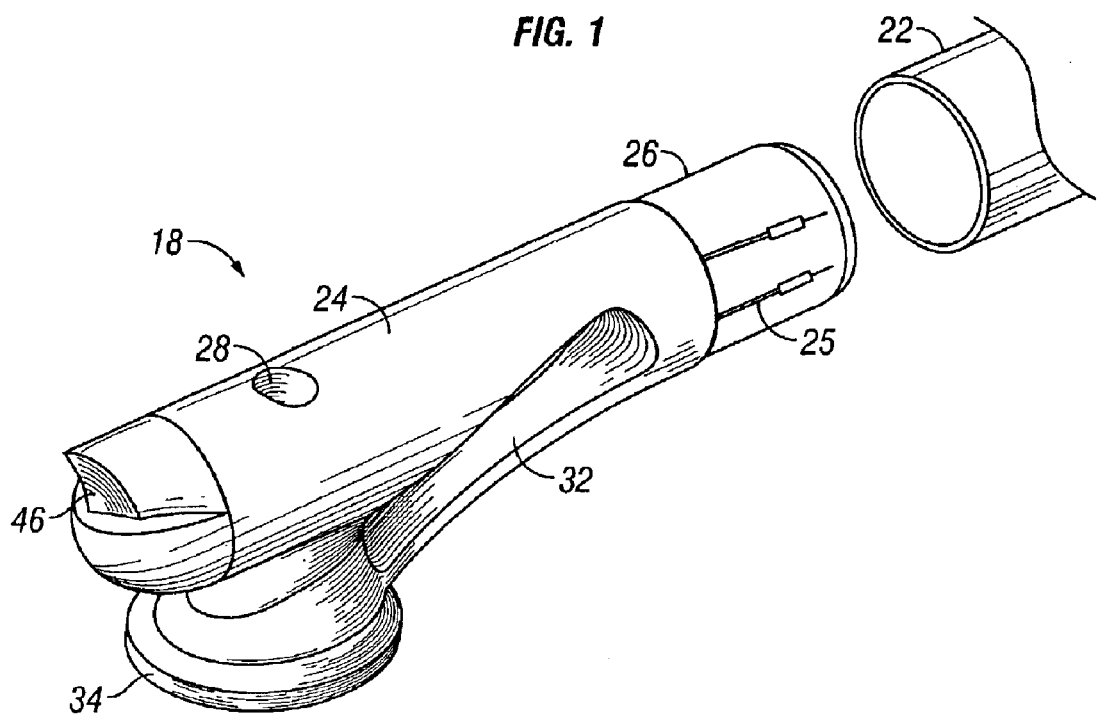
FIG. 1
FIG. 2

LIGHTED TIE DOWN ANCHOR AND METHOD FOR USING SAME

BACKGROUND OF THE INVENTION

The present invention relates to a lighted tie down anchor and method for using same.

Various tie down devices have been provided for vehicles having carrying beds such as pickups or other trucks. These tie down devices enable the operator to tie down an object carried in the carrying bed of the vehicle.

There is a need for providing a lighted tie down anchor which can supplement the tail lights, running lights, brake lights and signal lights of a vehicle.

Therefore a primary object of the present invention is the provision of an improved lighted tie down anchor and method for using same.

A further object of the present invention is the provision of a lighted tie down anchor that can be connected into the electrical circuitry for the tail light, running light, brake light or signal light of the vehicle.

A further object of the present invention is the provision of a lighted tie down anchor that provides supplemental light to the light provided by the tail light, running light, brake light or signal light of the vehicle.

A further object of the present invention is the provision of a lighted tie down anchor that is economical to manufacture, durable in use, and attractive in appearance.

BRIEF SUMMARY OF THE INVENTION

The foregoing objects may be achieved by a lighted anchor for a vehicle having a carrying bed with opposite upstanding side walls. The vehicle also includes a tail light, a vehicle power source, and vehicle electrical circuitry interconnecting the power source to the vehicle tail light for actuating the vehicle tail light.

The lighted anchor comprises an anchor member on at least one of the upstanding side walls of the carrying bed. An anchor light is attached to the anchor member and electrical anchor wires are connected to the anchor light for actuating the anchor light when the electrical anchor wires are connected to the vehicle electrical power source.

According to one feature of the invention the wires from the anchor light are connected to the vehicle electrical circuitry in such a manner that the anchor light lights whenever the brake light lights in response to actuation of the brakes.

According to another feature of the invention the vehicle includes a turn signal connected to the vehicle circuitry and the tail light comprises a turn signal light which blinks alternatively on and off whenever the turn signal is actuated. A connector connects the electric anchor wires to the vehicle circuitry in such a manner that the anchor light blinks alternatively on and off in unison with the turn signal light whenever the turn signal is actuated.

According to another feature of the invention the anchor member includes a tie down grommet for attaching a tie down line to the anchor member. The tie down grommet may be a hole that extends through the anchor member, or it may be a partially open eye or eyelet for securing a tie down member to the anchor member.

The method of the present invention comprises attaching the anchor member to one side wall of the vehicle and connecting the loose end of the anchor wires to the vehicle electrical circuitry so that the anchor light will be actuated and deactuated whenever the tail light is actuated and deactuated respectively.

BRIEF DESCRIPTION OF THE DRAWINGS

FIG. 1 is a perspective view of a vehicle having a lighted tie down anchor attached thereto.

FIG. 2 is a perspective view of the lighted tie down anchor.

DETAILED DESCRIPTION OF THE PREFERRED EMBODIMENT

Figure 3:
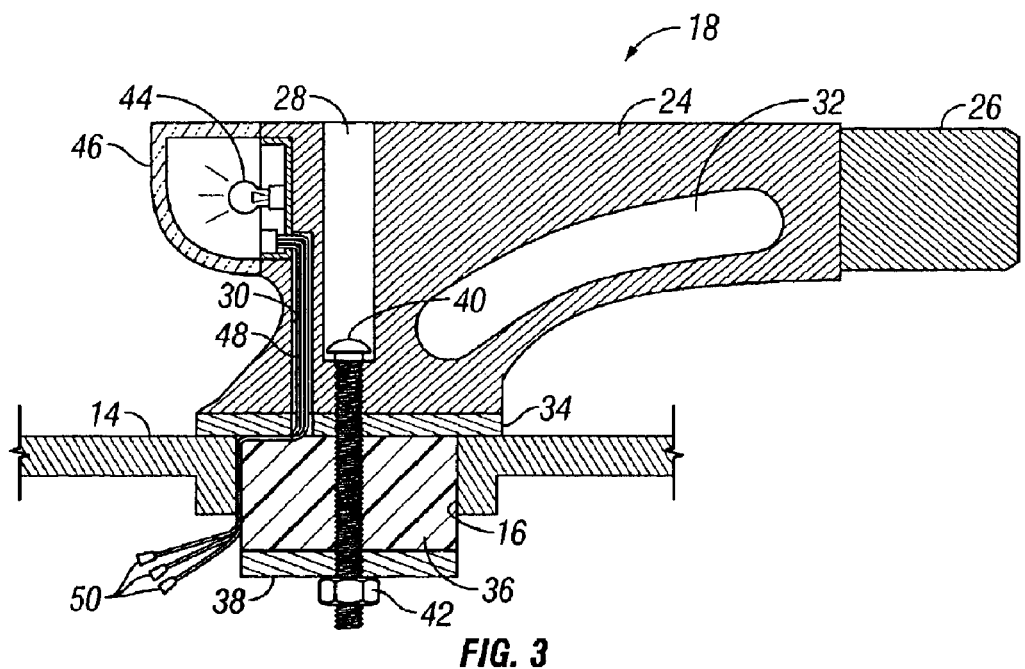
FIG. 3 is a sectional view of the lighted tie down anchor, showing the internal structure thereof and showing the manner in which it is attached to the vehicle side wall.
Figure 4:
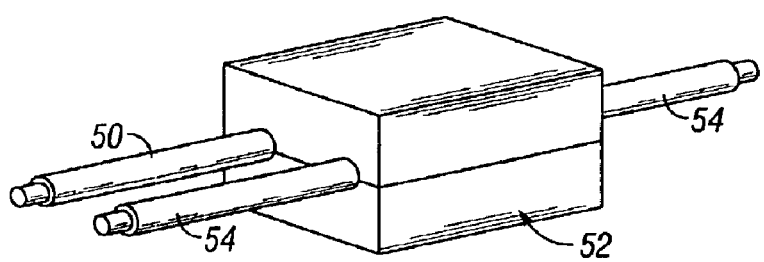
FIG. 4 is a perspective view of a connector for connecting the wires from the light to the wires from the tail light of the vehicle.

Referring to the drawings the numeral 10 generally designates a vehicle having a carrying bed therein. The vehicle includes a pair of spaced apart sidewalls 12 which are on opposite sides of the carrying bed. Each of the side walls includes an upper edge 14 and one or more stake pockets 16 (FIG. 3) or holes in the upper edge 14 of the side wall 12.

Attached to the side wall 12 are a rear anchor 18 and a front anchor 20 and an elongated rail 22 which extends therebetween and is connected thereto. The rear anchor 18 includes a central body 24 having a reduced diameter portion 26 at its forward end. A plurality of darts 25 are provided on the outer surface of the reduced diameter 26 for facilitating a press fit between the rear anchor member 18 and the elongated rail 22.

Referring to FIG. 3, the central body 24 includes a first vertical bore 28 extending downwardly therein. A second vertical bore 30 is provided to one side of the bore 28. An arcuate tie down grommet 32 is surrounded by the central body 24. While tie down grommet 32 is shown to be completely surrounded by the central body 24, it is possible that the grommet 32 is partially open at one of its perimetric edges so as to create a C-shaped eyelet for receiving a tie down cord. Also, the grommet 32 may be completely eliminated, leaving central body 24 without any grommet 32. Central body 24 includes a flat base 34 at its bottom and this flat base 34 abuts against the upper edge 14 of the side wall 12. A rubber expansion member 36 protrudes downwardly into the stake pocket 16 and include an expansion washer 38 engaging its lower end. A bolt 40 extends downwardly within the vertical bore 28 and through the rubber expansion member 36 and the expansion washer 38. A nut 42 is threaded on its lower end. By tightening nut 42 it is possible to expand the rubber expansion member 36 and by so doing secure the anchor member 18 within the stake pocket 16.

An anchor light 44 is provided as the rear end of the anchor member 18. Anchor light 44 includes a lens 46 and a plurality of anchor light wires 48 extending downwardly therefrom. The anchor light wires include loose lower ends 50. As can be seen in FIG. 3 the wires 48 extends downwardly through the second vertical bore 30 and then turn at right angles twice to pass around the rubber expansion member 36. The lower loose ends 50 protrude outwardly below the upper edge 14 of the side wall. While the wires 50 are shown to be three parts in FIG. 3, it is also possible to include four or more parts to the wires depending upon the particular application required.

Figure 5:
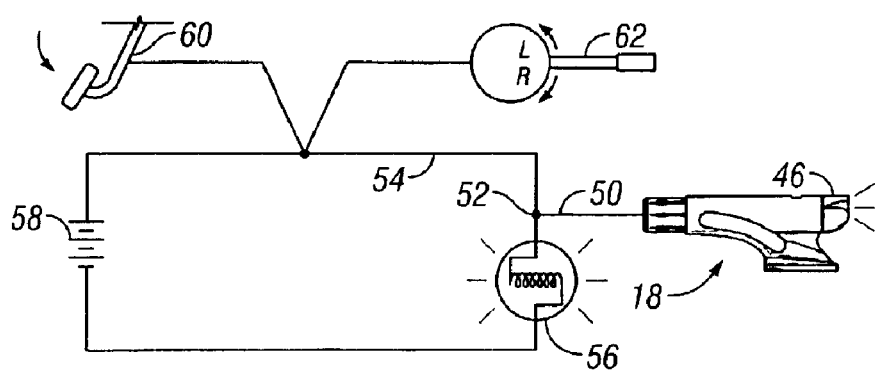
FIG. 5 is a schematic view showing the electrical circuitry connected to the anchor light.

The loose ends of the wires 50 are each attached by a connector 52 to one of the tail light wires 54 of the tail light 56 in the vehicle. The schematic for this connection is shown in FIG. 5 wherein the tail light wires 54 are connected to a power source 58 and include a brake peddle 60 and a turn signal 62 therein. The brake pedal 60 and the turn signal 62 may be both connected to the loose ends 50 of the anchor light wires 48 or one or the other may be connected.

While a light bulb 44 is shown in the drawings, an LED may be preferred to the light bulb 44.

In operation, the tail light 56 is generally on whenever the running lights of the vehicle are placed in the on position. In that mode, the light 44 also is actuated in conjunction with the tail light 56. In this running light mode, the tail light 56 and the anchor light 44 have a lower intensity than the brake signal or the turning signal to be described hereafter. When the brake pedal is depressed, the tail light 56 increases in its intensity to a brake signal and similarly the anchor light 44 also increases in its intensity. Similarly, when the turn signal 62 is actuated the tail light 56 blinks alternatively in a turn signal from its intense light to its less intense light. The anchor light 44 blinks simultaneously in the same manner.

As shown in FIG. 1, the anchor member may be used also as a tie down member for securing tie down lines 64 thereto and also for securing the tie down lines 64 to an object 66 being carried in the vehicle.

The installation of the rear lighted anchor 18 is simple. The wires are threaded downwardly through the opening 30 and around the expansion member 36. The bolt 40 is then tightened to secure the anchor member 18 in the stake pocket 16. Then the lower ends 50 of the wires 48 are connected by connectors 52 to the electronic circuitry of the tail light 56 in the manner shown in FIG. 5.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. In combination;
    a vehicle having a carrying bed with opposite upstanding side walls, an electrical vehicle tail light, an electrical vehicle power source, and vehicle electrical circuitry interconnecting the electrical vehicle power source to the vehicle tail light for actuating the vehicle tail light, the opposite upstanding side walls each having a front stake hole and a rear stake hole;
    a front anchor member having a front attachment member protruding within the front stake hole of one of the upstanding side walls of the vehicle carrying bed and attaching the front anchor member to the one upstanding side wall;
    a rear anchor member having a rear attachment member protruding within the rear stake hole of the one upstanding side wall of the vehicle carrying bed and attaching the rear anchor member to the one upstanding wall;
    the front and rear anchor members each having a tie down grommet therein for attaching a tie down line to the front and rear anchor members, respectively;
    an elongated tube member having a front end attached to the front anchor member and having a rear end attached to the rear anchor member;
    the rear anchor member having a front end attached to the rear end of the elongated rube member and having a rear end;
    a light fixed to the rear end of the rear anchor member;
    the light having a plurality of wires extending downwardly through the rear stake hole to which the rear anchor member is attached;
    a connector connecting the plurality of wires extending downwardly from the light to the vehicle electrical circuitry, whereby the light of the rear anchor member will be activated at the same time that the vehicle tail light is actuated; and
    the rear anchor member including a bore therein, the plurality of wires extending from the light and through the bore before extending downwardly through the stake hole.

2. A combination according to claim 1 wherein the vehicle includes brakes capable of actuation and deactuation; the vehicle tail light being a brake light that is lighted whenever the brakes of the vehicle are actuated; the connector connecting the electrical anchor wins to the vehicle electrical circuitry in such a manner that the anchor light is lighted whenever the brake light is lighted.

3. A combination according to claim 1 wherein the vehicle includes a turn signal connected to the vehicle electrical circuitry and capable of actuation and deactuation, the tail light comprising a turn signal light that blinks alternatively on and off whenever the turn signal is actuated; the connector connecting the electrical anchor wires to the vehicle circuitry in such a manner that the anchor light blinks alternatively on and off in unison with the turn signal light whenever the turn signal is actuated.

* * * * *

UNITED STATES PATENT AND TRADEMARK OFFICE
CERTIFICATE OF CORRECTION

PATENT NO. : 6,935,820 B2
DATED : August 30, 2005
INVENTOR(S) : Elwell et al.

It is certified that error appears in the above-identified patent and that said Letters Patent is hereby corrected as shown below:

Column 4,
Line 39, should read -- necting the electrical anchor winswires to the vehicle electrical --.

Signed and Sealed this

Eighth Day of November, 2005

JON W. DUDAS
*Director of the United States Patent and Trademark Office*

UNITED STATES PATENT AND TRADEMARK OFFICE
CERTIFICATE OF CORRECTION

PATENT NO.         : 6,935,820 B2
APPLICATION NO. : 10/379948
DATED                : August 30, 2005
INVENTOR(S)       : Elwell et al.

It is certified that error appears in the above-identified patent and that said Letters Patent is hereby corrected as shown below:

<u>Col. 4, line 39:</u>

"wins" should read --wires--.

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,935,820 B2 |
| APPLICATION NO. | : 10/379948 |
| DATED | : August 30, 2005 |
| INVENTOR(S) | : Elwell et al. |

It is certified that error appears in the above-identified patent and that said Letters Patent is hereby corrected as shown below:

<u>Col. 4:</u>

Line 39 should read --necting the electrical anchor wires to the vehicle electrical --.

Signed and Sealed this

Seventh Day of August, 2007

JON W. DUDAS
*Director of the United States Patent and Trademark Office*